(No Model.)

G. W. MILLER.
GATE.

No. 301,912.

2 Sheets—Sheet 1.

Patented July 15, 1884.

Witnesses:
E. P. Hough.
C. E. Jones.

Inventor:
George W. Miller
By Chas. J. Gooch
his Attorney.

(No Model.)

G. W. MILLER.
GATE.

No. 301,912. Patented July 15, 1884.

UNITED STATES PATENT OFFICE.

GEORGE W. MILLER, OF HYNDMAN, PENNSYLVANIA.

GATE.

SPECIFICATION forming part of Letters Patent No. 301,912, dated July 15, 1884.

Application filed November 16, 1883. (No model.)

*To all whom it may concern:*

Be it known that I, GEORGE W. MILLER, a citizen of the United States of America, residing at Hyndman, in the county of Bedford and State of Pennsylvania, have invented certain new and useful Improvements in Gates, of which the following is a specification, reference being had therein to the accompanying drawings.

This invention relates to that class of gates that are opened by swinging or tilting the same upward and rearward. The gate is mounted at its rear lower end upon a bar or rod hinged or pivoted to posts or standards. The latch is connected, by means of a rod or chain at each side of the gate, with hand-levers pivotally connected with said posts or standards, whereby upon depressing the outer end of either of said levers the latch will be retracted and the gate raised or tilted rearwardly; and an arm or lever is pivotally connected at one end with the latch, and at its other end connected with a lever or arm whose lower end projects beyond the bottom of the gate, so that upon the gate being allowed to drop down, such lower end of said lever or arm will come in contact with the ground or gate-support and force the latch into locking position, all as hereinafter described and claimed.

Figure 1:
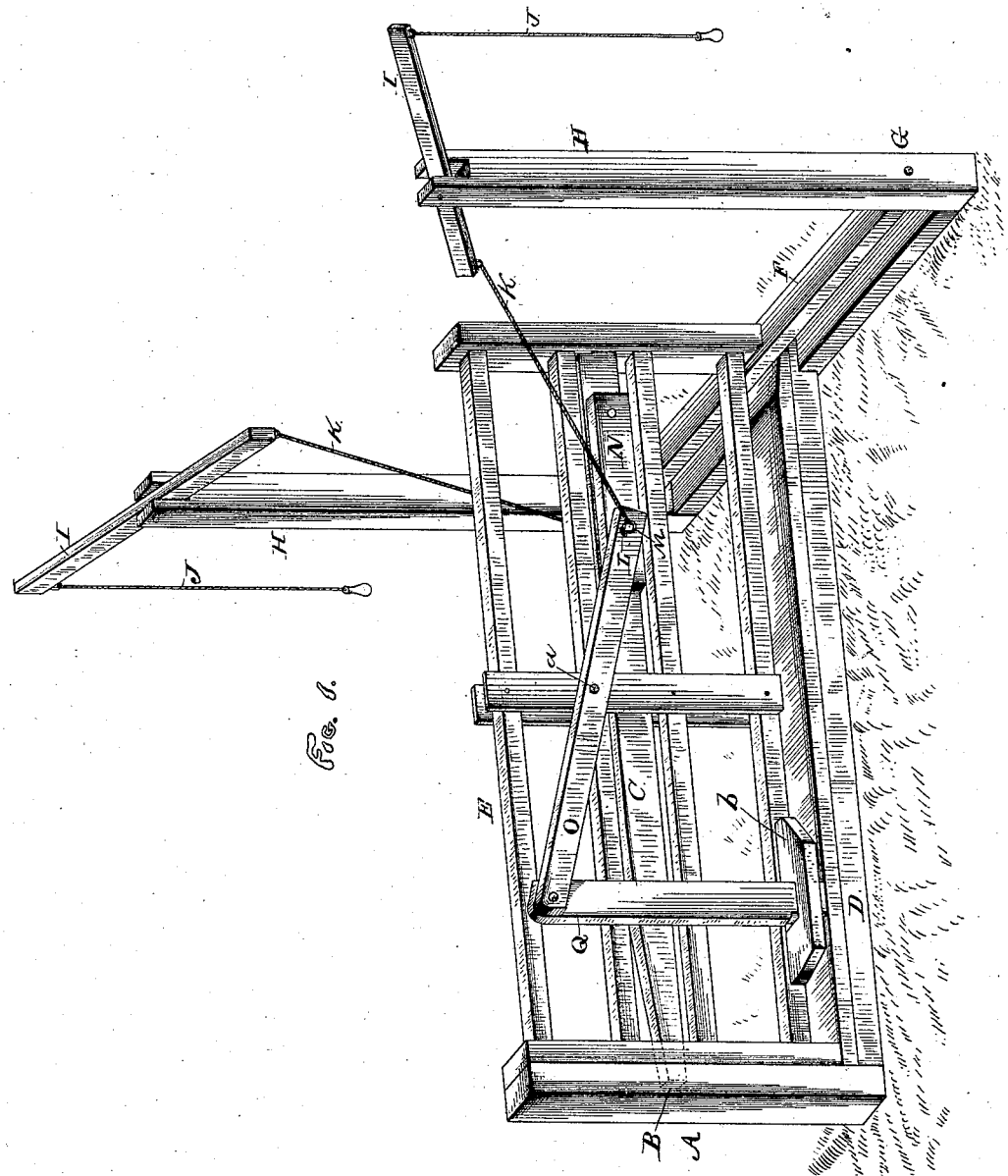
Figure 2:
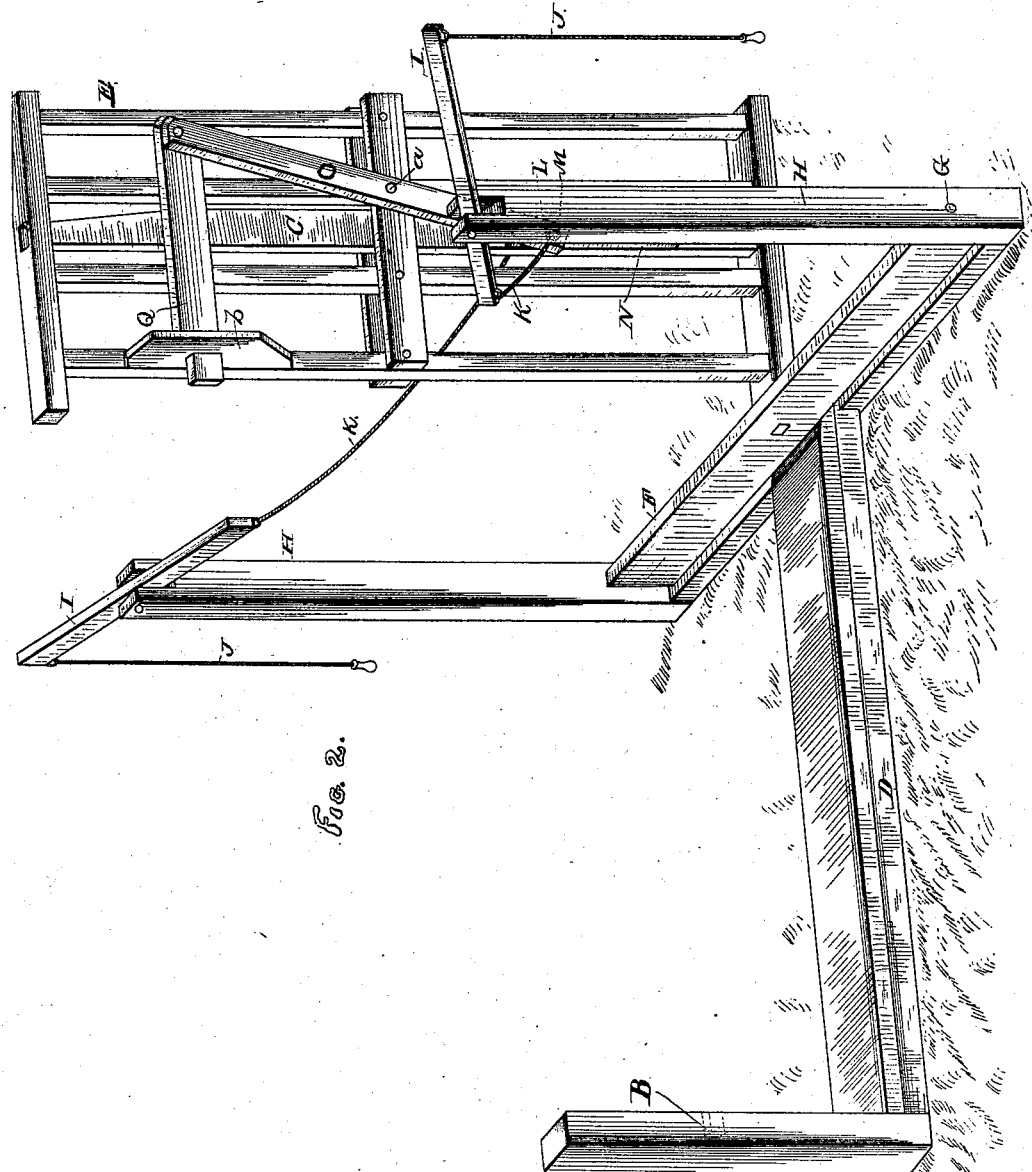

In the drawings, Figure 1 represents a perspective view of my improved gate closed. Fig. 2 represents a perspective view of the same in raised or opened position.

A represents the post having the mortise or catch B, for the reception of the front end of the gate-latch C. The lower end of this post is either inserted directly in the ground or in a base or sill, D, as preferred.

E represents a gate, which may be constructed of any desired material and design. The upper rear end of this gate is free, while its lower rear end is connected with a transverse bar, plate, or rod, F, hinged or pivoted at each end, at G, within the inner faces of the lower ends of uprights or standards H H, whose lower ends are sunk in the ground or secured thereto in any desired or convenient manner. Pivoted to or within the upper end of each upright or standard H is a lever or arm, I, from whose outer end depends a handle, chain, rope, or other suitable device, J, by means of which said levers I may be operated from either side of the gate, the party desiring to open said gate grasping and pulling down such handle, chain, &c., J.

To the inner end of each lever I is connected one end of a chain, wire, cord, or similar device, K. The opposite ends of these chains or analogous devices K are connected at L, by means of staples or eyes M, either directly to the latch C or to a plate or bar, N, attached to said latch, which latch in the drawings is shown as extending horizontally of the gate its whole length, being guided and sliding at each end within slots or mortises in the ends of the gate, and supported by a pivoted bar or plate, O. When the gate is closed and locked, as shown in Fig. 1 of the drawings, and it is desired to open the same, the person desiring to open said gate pulls downward upon the handle, chain, or rope J on that side of the gate at which he is. This act draws down the outer end of the pivoted lever I, to which said chain or rope J is connected, and raises the inner end of said lever. As this inner end rises it draws rearward and upward the chain or cord K, which in its turn retracts the latch and raises and tilts rearwardly the front end of the gate, in the manner shown in Fig. 2 of the drawings. As the rear end of the gate is connected with the pivoted supporting-bar F, a slight pull upon the handle, chain, or rope J and lever I will suffice to tilt the gate rearwardly and upwardly, as the pivotal connection of the bar F with the standards H is sufficiently free to permit of its easily turning therein.

O represents an arm or strap pivotally connected at its center, at *a*, to the gate-frame, its rear end being connected to the bar N, or to the latch-bar, and its front or outer end being connected to the upper end of a short arm or bar, Q, sliding vertically in a guide, *b*, attached to one of the horizontal bars of the gate. In the normal position of this arm or bar Q its lower end projects below the bottom of the gate and rests upon the ground, or upon the base or sill D, when one is employed. When the latch is retracted, the bar O is also retracted and draws upward the bar Q; but when the downward pull upon the lever is released, and the gate thereby permitted to drop back to a horizontal position, said bar Q descends to its lowest position, in which its lower end projects beyond the bottom of the gate for a slightly greater distance than is the space between the bottom of the gate and the surface of the ground, or the sill D, when that is used. Consequently, upon the gate's descending to its horizontal position, the lower end of the bar Q will strike the ground or sill first, and the impact thereof will force said bar upward. As said bar Q rises it carries with it the strap O, forming an angular connection with the bar or plate N, and draws said bar N, and the latch connected therewith, forward, and forces the front end of said latch into the mortise or recess in the gate-post A, and thus automatically locks the gate.

Having thus described my invention, what I claim therein is—

1. In a tilting gate, the combination, with the latch, of a vertically-sliding bar, Q, adapted to project below the gate, and suitable connections with said latch rearwardly of said bar, substantially as and for the purpose set forth.

2. In a tilting gate, the combination, with the gate E, latch-post A, and horizontally-extending latch C, of a vertically-sliding bar, Q, adapted to project below the gate, and centrally-pivoted bar O, connected at its respective ends to said latch C and bar Q, for the purpose of automatically locking the gate on its descent, substantially as set forth.

3. In a tilting gate, the combination, with the latch-post A and uprights H, of the gate E, connected at its lower rear end with a transverse bar, F, bar F having pivotal bearing at each end in the standards H, levers I, pivotally attached to the standards H, and having at their outer ends suitable operating devices, and at their inner ends chains, or their equivalent, connecting with the latch, latch C, bar N, attached to the rear of said latch, vertically-reciprocating bar Q, adapted to project below the gate, guide $b$, attached to the gate for the purpose of guiding the bar Q in its vertical movement, and the centrally-pivoted bar O, connecting the latch C and bar Q, for the purpose of securing the automatic locking of the gate on its descent, substantially as set forth.

In testimony whereof I affix my signature in presence of two witnesses.

GEORGE W. MILLER.

Witnesses:
 F. S. WELLER,
 D. J. COOK.